Oct. 31, 1961     G. A. DIEHL     3,006,285
MEANS FOR MOVING CARS TO STORAGE STALLS
Filed Oct. 13, 1958     3 Sheets-Sheet 1
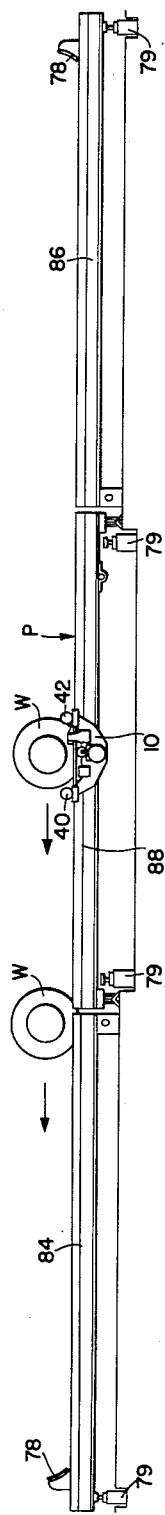
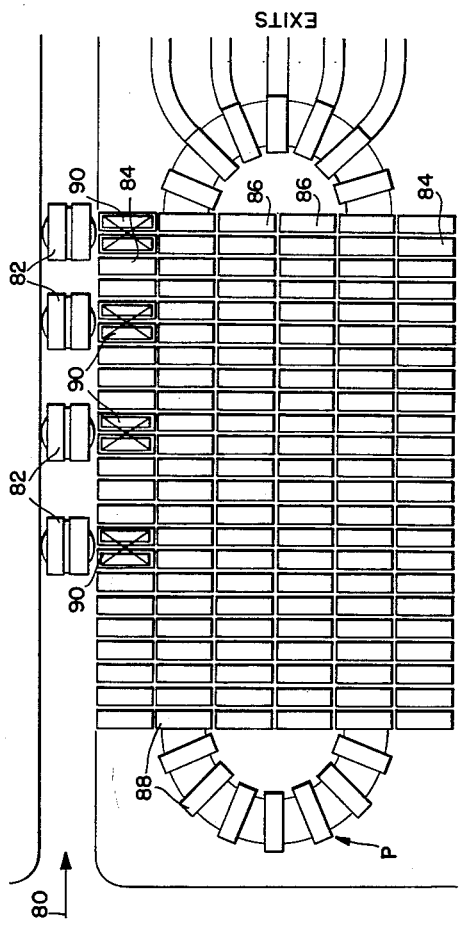
GLENN A. DIEHL
*INVENTOR.*
BY Smith & Tuck Oct. 31, 1961 G. A. DIEHL 3,006,285
MEANS FOR MOVING CARS TO STORAGE STALLS
Filed Oct. 13, 1958 3 Sheets-Sheet 2
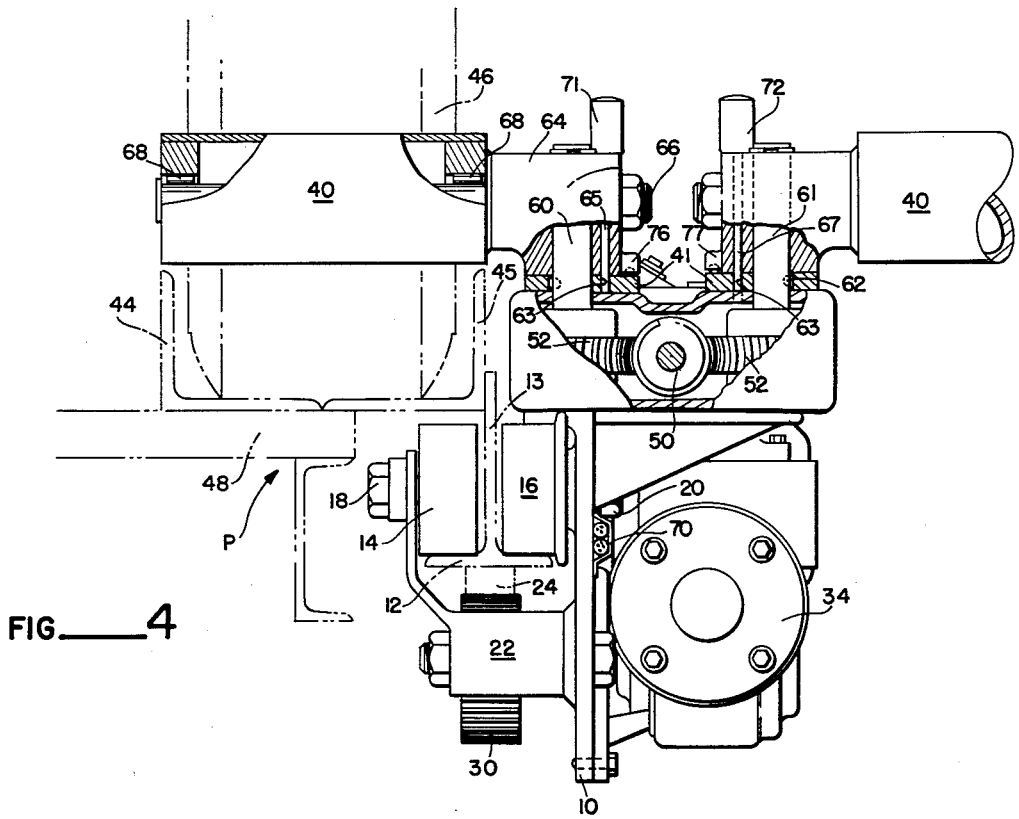
FIG. 4
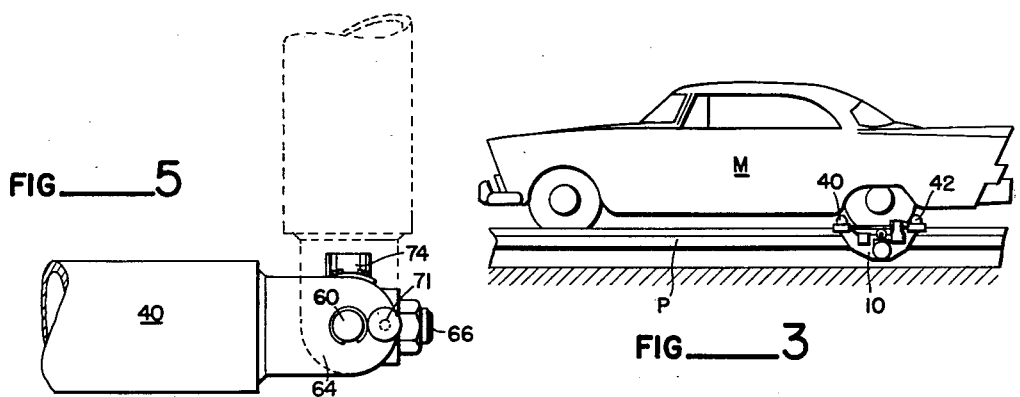
FIG. 5
FIG. 3
FIG. 6
GLENN A. DIEHL
*INVENTOR.*
BY
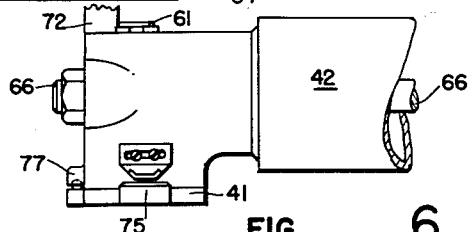

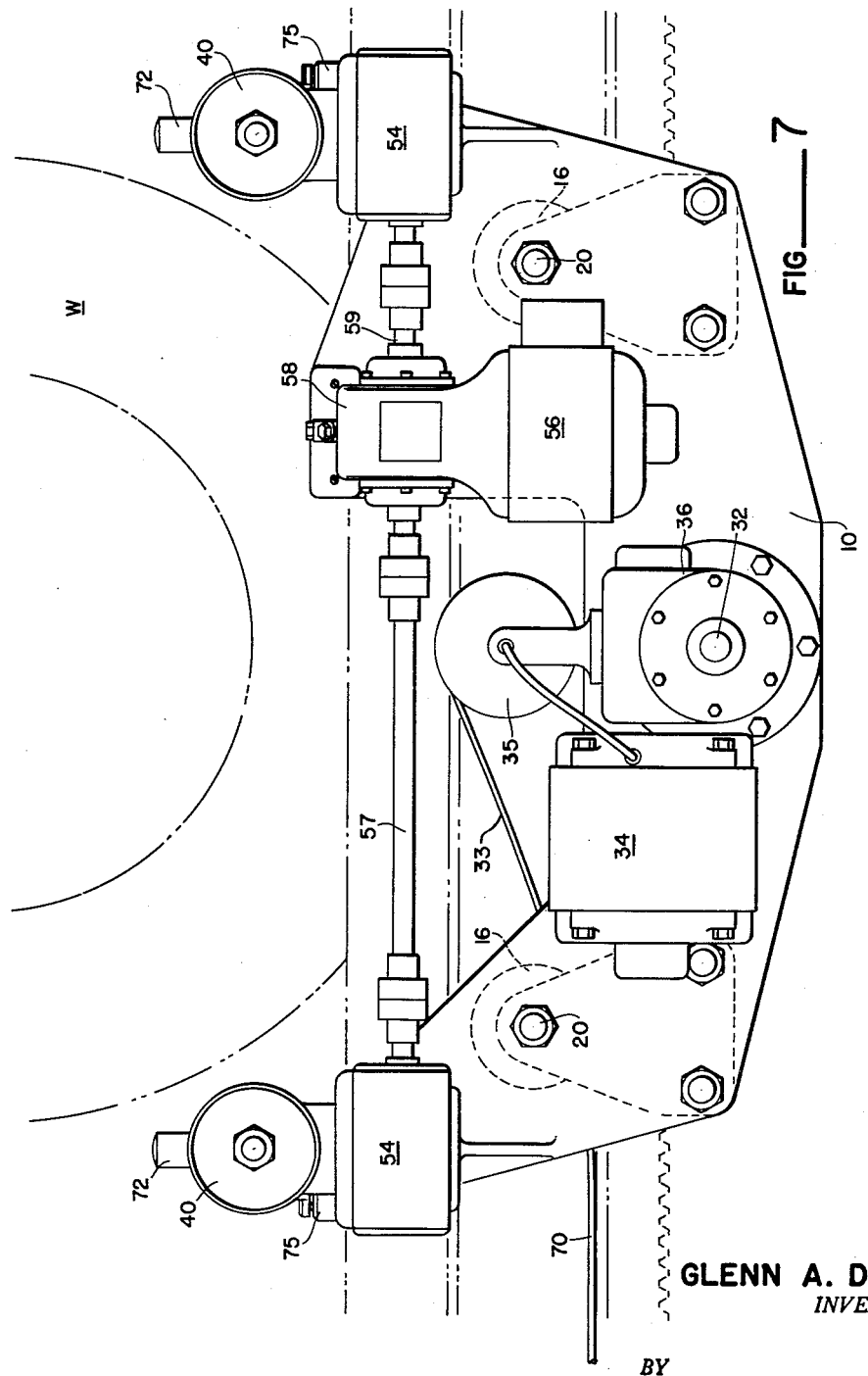

United States Patent Office 3,006,285
Patented Oct. 31, 1961

3,006,285
MEANS FOR MOVING CARS TO
STORAGE STALLS
Glenn A. Diehl, Seattle, Wash., assignor to Rota Parking, Inc., Seattle, Wash., a corporation of Washington
Filed Oct. 13, 1958, Ser. No. 766,949
6 Claims. (Cl. 104—50)

This present invention relates to the general art of mechanical devices for the storage of automobiles and more particularly to a power driven transfer vehicle which is installed on a level below the level of the under surface of the average automobile body and which engages one of the rear wheels of the automobile by horizontal rollers which engage the automobile wheel below the supporting axle and transversely of the body of the automobile.

In the mechanical parking of automobiles, it has been found that there are a great number of different site conditions which largely determine the type of automobile parking means which can be most advantageously employed. My present transfer vehicle may be employed with many different forms of automobile parking devices but it has been found particularly advantageous in that form of parking which is shown in its general arrangement in U.S. Patent No. 1,851,262. A most economical employment of this present equipment is as a transfer device to simplify the parking arrangement of the type shown in the patent noted. In this present instance, it is possible to employ a single movable belt line carrying automobile supporting platforms around a generally rectangular track having parallel sides and curved ends. The simplification arises from the fact that with my transfer vehicle all the space adjacent the belt line moving the one line of car platforms can be utilized to park cars, both inside and outside of the movable line of platforms. As only a small portion of the total number of platforms are movable, a very economical installation can be achieved and one that is well within the range of economical and commercial operation.

The principal object of my present invention therefore is to provide a transfer vehicle which is geared to the car holding platform as it moves a car supported wholly or in part by the platform.

A further object of this invention is to provide a transfer vehicle of very low height, which can be electrically driven and can pass from one car platform to another clear across the parking area if the same is desirable.

A further object of this present invention is to provide a transfer vehicle which because of its low height can not engage and damage any of the parts of the automobile body or chassis.

A further object is to provide a transfer vehicle having rollers pivoted to swing horizontally 90°, one to engage the front tread portion of the tire and the other the rear tread portion and both of them engaging the tire below the level of the lowest portion of the automobile body.

Further objects, advantages and capabilities will be apparent from the description and disclosure in the drawings, or may be comprehended or are inherent in the device.

In the drawings:

FIGURE 1 is a side elevation showing, in almost diagrammatical simplicity, the association of my vehicle with a car supporting platform and illustrating how the transfer vehicle engages the tread portions of an automobile's rear wheel.

FIGURE 2 is a plan view of the type of parking arrangement, which is particularly well served by my transfer vehicle.

FIGURE 3 is a side elevation, partly in section, illustrating the general proportions of my transfer vehicle as compared with an automobile which it serves.

FIGURE 4 is an end elevation of my transfer vehicle with certain parts being broken away and sectioned to better illustrate their structure.

FIGURE 5 is a horizontal, fragmentary view showing the two positions of my wheel engaging rollers, the same being shown broken away and sectioned.

FIGURE 6 is an elevation of my roller pivot means with the roller broken away and sectioned.

FIGURE 7 is a side elevation showing my transfer carriage and with certain associated parts shown in dashed lines in order to more fully illustrate the relative proportions of the transfer vehicle and the automobile wheel with which it is used.

Referring to the drawings, throughout which like reference characters indicate like parts, 10 designates the main framework of my transfer vehicle. This frame is shown in end elevation in FIGURE 4 and in side elevation in FIGURE 7. Framework 10 is supported for longitudinal movement from preferably an inverted T section 12 of structural steel secured to an automobile supporting platform P and substantially below the axles of automobiles supported by platform P. In order to give stability and accurate positioning to the framework 10 and the associated parts secured thereto, two rollers are provided at each end of the framework as the closely spaced plain roller 14 and the flanged roller 16. These rollers for purposes of stability are normally best employed in cooperative pairs having a common axis of rotation but separate rotating stub shafts as indicated at 18 and 20. Shaft 18 is supported and positioned by bracket member 22, which in turn is secured to frame 10. The flanged wheel or roller 16 is separately supported on bolt 20 so that in effect the two rollers are disposed on opposite sides of web 13 of T bar 12. Flange wheel 16 is provided so that the preponderance of mass which is outside of the plane of the supporting beam 12 will be adequately resisted in its attempt to revolve the framework about beam 12. Also secured preferably to structural beam 12 is suitable positive drive trackage 24. Driving wheel 30 is adapted to operatively engage trackage 24, which extends the full length of the car supporting platforms P and also across each of the other car platforms across which it may be desirable to move the motor car M by means of my transfer vehicle. Gear 30 is mounted upon a worm gear shaft 32 which is driven by the electric motor 34 by means of a conventional worm and worm gear assembly housed within the gear box 36. A worm gear drive is particularly desirable in that there will be no coasting of the transfer vehicle the moment power is shutoff from motor 34 due to the self locking characteristic of suitably designed worm and worm gear driving units.

The purpose of the transfer vehicle is to move automobiles longitudinally of the car platforms P and to this end I have provided coacting free turning idler rollers 40 and 42, one disposed at each of the opposite ends of frame 10 and of a height to clear the guideway made of the unequal lengthed structural angles 44 and 45. These angles should be chosen of a size to dependably guide the automobile tire 46 and are preferably secured as by welding to the framework 48 of the car platforms P. Rollers 40 and 42 are preferably moved and held in their adjusted position by means of the self locking worm 50 and the worm gear 52. The two sets of this gearing, one at each end of frame 10, are housed within the gear boxes 54 and both are driven by the electric motor 56 through shafts 57 and 59, by suitable gearing positioned within housing 58. Rollers 40 and 42 must swing in opposite directions in order to simultaneously be positioned to move automobile wheel W or to be withdrawn from the moving position. One convenient way of providing this opposite rotation is to provide one roller as 40 with a right hand gear set and roller 42 with a left hand gear set or vice versa.

As a matter of economy the rollers may be arranged to engage two separate cars on separate but adjoining lines of platforms. Following this plan, each worm 50 drives two worm gears 52, as illustrated in FIGURE 4. As it may be desirable to move one car only, provision is made to return one coacting set of rollers to their inoperative position, parallel to the direction of travel of the cars. The clutching means to effect individual control of the roller pairs is shown in FIGURE 4. A pin disk 41 is keyed or otherwise secured to each of the vertical shafts 60 and 61 and has a pin receiving opening 63 to selectively engage pins 65 and 67 respectively. These pins are remotely controlled by solenoids 71 and 72 respectively. Roller heads 64 are free to revolve on shafts 60 and 61 except when pins 65 and 67 are engaged in holes 63 in disk 41. The rotation of rollers 40 and 42 is limited to 90° between their using and inoperative positions by limit switches 74 and 75 and ball detents 76 and 77. The limit switches cut out the power to motor 56 and the ball detents provide a definite stop. The limit switches, one at each roller assembly, are wired together as coacting pairs by a conventional three wire circuit so either switch may be moved to complete the electric circuit.

The construction of the rollers 40 and 42 will be understood, it is believed, from a study of FIGURES 4, 5 and 6. In FIGURE 4, it will be noted that a drive shaft 60 upon which worm gear 52 is secured is keyed as by key member 62 to the revolvable head 64. Head 64 must be of ample strength to move the automobile or to stop it and to this end a substantial axle bolt 66 is employed upon which the antifriction bearings for the rollers 40 and 42 are mounted. It is to be noted that there is no rotary drive for rollers 40 and 42. They are merely mounted on antifriction bearings 68 so they will roll freely when they are pressed against the automobile tire by the transfer carriage as it is moved lengthwise of the car platform by electric motor 34 through means of the gear 30 and trackage 24. Normally only one roller as 40 or 42 is actually in contact with the wheel for moving it. However, two rollers are necessary because the transfer vehicle must be capable of moving an automobile in either direction. Two rollers are also required for the actual movement of the car, one to move the car and the other to stop the car when electric current to motor 34 is turned off. Motor 34 is preferably of the reversing type and to this end it is normally fed with a three wire circuit, the conductors of which are indicated at 70 and which preferably obtain their electric current from a fixed outlet by means of a flexible, insulated cable 33. This cable is spooled on a reel 35 secured to the transfer vehicle and pays out cable or takes up the slack depending on the direction the vehicle is moving. Various means are used to energize such reels such as a spiral spring or an adjustable one way friction drive.

My transfer vehicle, as noted, is capable of movement in either direction along its supporting structural steel trackage 12 and is provided with the three conductor cables indicated at 70 to operate respectively the electric motors 34 and 56 and to operate the same, independently, in either direction as conditions require. I further prefer to include in this cable means, conductors for the solenoid roller locking means. This transfer vehicle is intended for use with a specific form of automobile parking which is shown diagrammatically in FIGURE 2, in which the cars are normally entered into the parking area in the direction indicated by arrow 80. The cars normally are passed over the turntables 82 until the various turntables have been filled starting with the one furthest from entry 80. Assuming that a one level parking lot is being employed, turntables 82 have as their principal function the orienting of the automobiles positioned on the elevator platforms shown in FIGURE 2 to a position in alignment with the parking area platforms. Two types of platforms are provided, the outer rows of platforms 84 and the inner rows of platforms 86 and the movable platforms 88. When the automobiles are oriented by being turned 90°, they are then engaged by one of my transfer vehicles associated with the platforms on turntables 82. The car is then moved off of the turntable onto the aligned fixed platforms 84 where they may be momentarily stored until the traveling series of movable platforms 88 is brought to a halt. At this time, the car may be moved onto a movable platform 88, that is in alignment with the car and then the movable platforms may be moved one car space to make way for the loading of additional cars on the movable platform units.

As previously noted my transfer vehicle may by means of the two complete sets of towing rollers 40—42, move two cars at once or it may selectively move a single car on either side of the vehicle.

There may, however, be lulls in the reception of the cars and in these periods it may be desirable not to move the movable platforms and thus permit transfer vehicles, operating with platforms aligned with each of the various turntables 82, to move entirely across the fixed storage platforms 86 and across the movable, but now at rest platforms 88 to the storage platforms 84. With this explanation, it is believed, our transfer vehicle simplifies the construction of the parking area as shown in FIGURE 2 as distinct from that shown in prior Patent No. 1,851,262 as noted and permits using this equipment in a variety of ways to readily adapt it to the conditions of the moment, during a parking day. It is believed, it will be apparent that there is a very appreciable reduction in cost by having the movable platforms on a single moving belt line instead of having several of these with the attendant expensive trackage and handling means. This present transfer vehicle of course makes it possible to readily employ the arrangement of FIGURE 2 in a plurality of superimposed floors which will be served by the elevators 90. Such an arrangement greatly reduces the mechanism employed over some of the forms of multistory parking in which it is necessary to have the elevators longitudinally as well as vertically movable. In distinction to this arrangement, this present plan contemplates elevators 90 that are fixed and operate much the same as any ordinary elevator. Elevators of this order have been quite highly developed and standardized and insure very quick handling of automobiles and this in turn overcomes one of the deficiencies noted in a large number of automobile storage arrangements in that they may require quite a period of time to actually return to the owner, the automobile that he has left for storage. In my present transfer vehicle, it is possible to quickly bring an automobile from any of the floors to one of the elevators and as the elevators are conventional in design and they are relatively inexpensive, a number of them may be employed to the end that a plurality of cars can be stored or be in the process of delivery at the same time.

The transfer vehicles are small and relatively inexpensive consequently they may be employed at any point where cars are to be moved and are especially appropriate for moving cars up to the turntables or elevators or from the storage facility to the delivery exits.

It is believed that it will be clearly apparent from the above description and the disclosure in the drawings that the invention comprehends a novel construction of means for moving cars to and from storage stalls.

Having thus disclosed the invention, I claim:

1. A transfer vehicle for use in the mechanical parking of automobiles, comprising: a main framework having supporting wheels revolvably disposed at each end thereof, said wheels adapted to operatively engage trackage secured longitudinally of platforms on which automobiles are stored; power driven means for positioning automobile wheel engaging rollers on each of the front and rear tread surfaces and below the wheel axle, to move and stop the automobile as the transfer vehicle is moved with respect to the platform supporting the automobile; power driven means for positioning said rollers consisting of a vertical drive shaft driven through a self-locking gear drive by an electric motor; a circular plate fixedly secured to said shaft and having a drive pin opening disposed parallel to said shaft; a revolvable head disposed on the upper end of said shaft and having a driven pin adapted to coact with said drive pin opening to selectively couple said head to said shaft; remote control means for operating said drive pin; a horizontal roller disposed for swinging about said shaft to engage the tread portion of an automobile tire or to move said roller to a position parallel to the plane of said tire; said transfer vehicle adapted to move an automobile lengthwise of its supporting platform and electric current supply means for remotely controlling said roller positioning means and said drive means.

2. A transfer device for moving automobiles in the mechanical parking of automobiles, comprising: a main framework of a length slightly greater than the diameter of an automobile tire and coacting pairs of supporting wheels revolvably disposed at each end thereof, said wheels adapted to be revolvably supported from trackage positioned longitudinally of the path on which automobiles are to be moved; a coacting pair of revolvable rollers, pivoted at one end, outside of the vertical projection of the automobile to be moved, and adapted to be revolved 90° in the horizontal plane to engage the tread portion of an automobile wheel in a manner to revolve said wheel; power driven means for positioning said automobile wheel engaging rollers on each of the front and rear tread surfaces and below the wheel axle, to move and stop the automobile as the transfer device is moved with respect to the means for supporting the automobile; said means for positioning wheel engaging rollers consisting of two pairs of vertical drive shafts, one pair at each end of said main framework, each shaft having a self locking gear means secured thereto and a gear for driving each pair of said gear means; a horizontal plate fixedly secured to each of said shafts, and having drive pin openings disposed parallel to said shafts; a revolvable roller supporting head disposed on the upper end of each of said shafts and having drive pins adapted to coact with said drive pin openings to selectively couple said head to said shaft; remote control means for operating said drive pins; horizontal rollers secured to each of said roller supporting heads disposed for swinging about said shafts to engage, in a driving manner, the tread portions of automobile tires or to be moved to positions parallel to the plane of said tires; power driven means for moving said transfer device lengthwise of the path of the automobile and electric current supply means for remotely controlling said roller positioning means and said power driven means.

3. A transfer vehicle for use in association with automobile supporting platforms for the mechanical parking of automobiles, comprising: a main framework having coacting pairs of supporting wheels revolvably disposed at each end thereof, said pairs of wheels adapted to operatively engage the lower flange of a single hanging trackage secured longitudinally to platforms on which automobiles are stored; said trackage positioned substantially below the axles of automobiles stored on said platforms; a coacting pair of horizontally disposed automobile wheel engaging rollers operatively supported by said main framework; electric motor driven mechanical means for positioning said wheel engaging rollers on each of the front and rear tread surfaces of the wheel and below the wheel axle, to move and stop the automobile as the transfer vehicle is moved with respect to the platform supporting the automobile; power driven means for moving said transfer vehicle lengthwise of a plurality of automobile supporting platforms thus enabling one of said transfer vehicles to move an automobile the combined length of a plurality of aligned supporting platforms and electric current supply means for remotely controlling said roller positioning means and said drive means.

4. The subject matter of claim 3 in which the said electric current supply means comprises a flexible insulated multi-conductor cable secured at one end to a source of electric current; said cable providing three conductor circuits for control of the electric motors for propulsion and operating said wheel engaging rollers; self locking gearing for moving said rollers and holding them in their adjusted positions; clutching means to effect individual control of said rollers and solenoids to operate said clutching means; limit switches to provide electrical control of said solenoids and electric circuits for conveying the intelligence supplied by said limit switches employed to effect sequential and automatic operation of said transfer vehicle; a drum type reel revolvably secured to said main framework; drive means for said reel disposed to apply a limited rotative force to said reel permitting paying out cable as the said transfer vehicle moves away from said source of electric current and insuring the reeling in of cable as the transfer vehicle moves toward said source of electric current.

5. The subject matter of claim 3 in which the power driven means for moving automobiles lengthwise of their supporting platforms comprises two pairs of idler rollers, each pair disposed to swing in opposite directions, adapted to engage two automobiles disposed on adjacent platforms; positive drive trackage fixedly secured to and extending the entire length of said platform; a driving wheel operatively engaging said trackage and adapted to successively engage said trackage on a plurality of aligned platforms and propel said transfer vehicle the length of said platforms as it is moving an automobile being parked; said driving wheel supported from said main framework and driven by an electric motor through self locking gear means; means for supplying electric current to said electric motor and means for controlling the application of said electric current from a remote point.

6. An automobile transfer device for use in a system of mechanical parking of automobiles of the type where the automobiles are stored on movable platforms comprising: a main framework having coacting pairs of supporting wheels revolvably disposed at each end thereof, said wheels adapted to operatively engage opposite sides of a hanging, inverted T trackage secured to automobile storage platforms parallel to the path on which automobiles are to be moved; said trackage positioned substantially below the wheels of automobiles stored on said platforms; horizontal idler rollers supported by said main framework and adapted to swing from one end, in a horizontal plane to engage the tread of an automobile wheel; power driven self-locking means for positioning said automobile wheel engaging rollers on the tread surface of said wheel and below the wheel axle, in a manner to move the automobile with its weight carried on its own tires, as the transfer device is moved with respect to the surface supporting the automobile; power driven self locking means for driving said transfer device to move an automobile lengthwise of its path and electric current supply means for remotely controlling said roller positioning means and said power driven means for moving said transfer device.

References Cited in the file of this patent
UNITED STATES PATENTS 1,817,220    Young                Aug. 4, 1931

(Other references on following page)

UNITED STATES PATENTS

| | | |
|---|---|---|
| 1,864,711 | Buettell | June 28, 1932 |
| 1,885,213 | Aitken | Nov. 1, 1932 |
| 1,886,588 | Riblet | Nov. 8, 1932 |
| 1,891,795 | Buettell | Dec. 20, 1932 |
| 1,962,127 | Balkema et al. | June 12, 1934 |
| 2,016,662 | Aitken | Oct. 8, 1935 |
| 2,529,954 | McCann | Nov. 14, 1950 |
| 2,617,365 | Martin | Nov. 11, 1952 |
| 2,655,871 | Mazzola | Oct. 20, 1953 |
| 2,840,248 | Grove et al. | June 24, 1958 |